United States Patent
Chini et al.

(10) Patent No.: US 11,162,626 B2
(45) Date of Patent: Nov. 2, 2021

(54) PREFORM FOR MANUFACTURING A COMBINED HEATING AND ANTI-SURGE APPARATUS, AND APPARATUS CONSTITUTED THEREFROM

(71) Applicant: Röchling Automotive SE & Co. KG, Mannheim (DE)

(72) Inventors: Fabrizio Chini, Isera (IT); Elmar Pichler, Ritten (IT); Ivan De Metri, Bolzano (IT); Francesca Brunori, Leifers (IT); Christoph Ganthaler, Naturns (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 437 days.

(21) Appl. No.: 16/229,640

(22) Filed: Dec. 21, 2018

(65) Prior Publication Data

US 2019/0203868 A1    Jul. 4, 2019

(30) Foreign Application Priority Data

Dec. 28, 2017  (DE) ..................... 10 2017 223 862.3

(51) Int. Cl.
*F01N 3/10* (2006.01)
*F16L 55/04* (2006.01)
(Continued)

(52) U.S. Cl.
CPC .............. *F16L 55/04* (2013.01); *B29C 53/02* (2013.01); *B29C 65/60* (2013.01); *F24H 1/00* (2013.01);
(Continued)

(58) Field of Classification Search
None
See application file for complete search history.

(56) References Cited

U.S. PATENT DOCUMENTS 8,756,919 B2   6/2014  Hodgson et al.
9,702,287 B2   7/2017  Landes et al.
(Continued)

FOREIGN PATENT DOCUMENTS

| CN | 205895375 U | 1/2017 | |
|---|---|---|---|
| DE | 202011000201 U1 * | 8/2011 | ........... F01N 3/2066 |

(Continued)

OTHER PUBLICATIONS

Chinese Office Action dated Sep. 16, 2020 for CN Application No. 201811494438.4, 5 pages.
(Continued)

*Primary Examiner* — Joseph M. Pelham
(74) *Attorney, Agent, or Firm* — Rankin, Hill & Clark LLP

(57) ABSTRACT

A preform that is embodied for manufacture of a combined heating and anti-surge apparatus for automotive operating fluid tanks, in particular for automotive reservoir tanks for aqueous urea solution, encompasses a planar plastic component having at least one electrical resistance heating trace provided thereon and having anti-surge baffles embodied integrally with the planar plastic component and standing off therefrom, the planar plastic component including as functional portions a heating portion having at least one electrical resistance heating trace provided thereon and an anti-surge portion, two functional portions of the plastic component being connected to one another movably relative to one another.

15 Claims, 2 Drawing Sheets

(51) Int. Cl.
  *B29C 53/02* (2006.01)
  *B29C 65/60* (2006.01)
  *H05B 3/26* (2006.01)
  *F24H 1/00* (2006.01)
(52) U.S. Cl.
  CPC ............... *H05B 3/26* (2013.01); *H05B 3/267* (2013.01); *H05B 2203/013* (2013.01)

(56) References Cited

U.S. PATENT DOCUMENTS

| | | | | |
|---|---|---|---|---|
| 2004/0129708 | A1* | 7/2004 | Borchert | F02M 37/103 220/562 |
| 2007/0045044 | A1 | 3/2007 | Sullivan | |
| 2007/0157602 | A1* | 7/2007 | Gschwind | F02M 31/125 60/274 |
| 2011/0138790 | A1* | 6/2011 | Radillo | F01N 3/2066 60/303 |
| 2012/0225396 | A1* | 9/2012 | Harr | F01N 3/2066 432/120 |
| 2017/0254246 | A1* | 9/2017 | Chini | H05B 3/0014 |
| 2018/0264936 | A1* | 9/2018 | Rosch | F01N 3/2066 |

FOREIGN PATENT DOCUMENTS

| | | |
|---|---|---|
| DE | 102013210742 A1 | 12/2014 |
| DE | 102016207700 A1 | 11/2017 |
| EP | 2711224 A1 * 3/2014 | ........... B60K 15/077 |
| FR | 3 038 000 A1 | 12/2016 |
| FR | 3038000 A1 | 12/2016 |
| FR | 3080733 A1 * 11/2019 | ......... F02M 25/0224 |
| GN | 103061855 A | 4/2013 |
| GN | 205876448 U | 1/2017 |
| KR | 20130004624 A * 1/2013 | |

OTHER PUBLICATIONS

Espacenet Bibiographic Data for FR 3 038 000 published on Dec. 20, 2016, 1 page.
Espacent Bibliographic Data for CN 103061855 published Apr. 24, 2013, 1 page.
Espacent Bibliographic Data for CN 205876448 published Jan. 11, 2017, 1 page.
Espacent Bibliographic Data for CN 205895375 published Jan. 18, 2017, 1 page.
German Search Report for corresponding DE 10 2017 223 862.3 dated Oct. 24, 2018, 7 pgs.
Espacenet Bibliographic data:DE 102013210742 (A1), Published Dec. 11, 2014, 1pg.
Espacenet Bibliographic data:DE 102016207700 (A1), Published Nov. 9, 2017, 1pg.
Espacenet Bibliographic data:FR 3038000 (A1), Published Dec. 30, 2016, 2pgs.

* cited by examiner

PREFORM FOR MANUFACTURING A COMBINED HEATING AND ANTI-SURGE APPARATUS, AND APPARATUS CONSTITUTED THEREFROM

The present invention relates to a combined heating and anti-surge preform that is embodied for manufacture of a combined heating and anti-surge apparatus for automotive operating fluid tanks, in particular for automotive reservoir tanks for aqueous urea solution. The present invention furthermore relates to a heating and anti-surge apparatus manufactured from such a preform. The combined heating and anti-surge apparatus encompasses a planar plastic component having at least one electrical resistance heating trace provided thereon and having anti-surge baffles embodied integrally with the planar plastic component and standing off therefrom.

BACKGROUND OF THE INVENTION

A combined heating and anti-surge apparatus of this kind, for an automotive reservoir tank for storing aqueous urea solution for SCR exhaust emissions control by selective catalytic reduction of nitrogen oxides in the exhaust of internal combustion engines, is known from FR 3 038 000 A1. This document discloses an anti-surge apparatus, manufactured by injection molding, for a urea tank in a motor vehicle, having an electrical resistance heating trace embedded therein. The electrical resistance heating traces are integrated into the anti-surge baffles. FR 3 038 000 A1 teaches either to overmold an electrical resistance heating trace with a thermoplastic, or to arrange an electrical resistance heating trace in sandwich fashion between two plastic shells, and to combine the plastic shells to yield a plastic component.

It is also known from FR 3 038 000 A1 to embody or equip a planar plastic component, having an electrical resistance heating trace provided thereon, with ribs in order to increase the area through which heat can be discharged from the resistance heating trace to the external environment.

SUMMARY OF THE INVENTION

Proceeding from the existing art recited above, an object of the present invention is to facilitate the manufacture and installation of a combined heating and anti-surge apparatus.

This object is achieved according to the present invention by a combined heating and anti-surge preform of the kind recited previously in which the planar plastic component comprises as functional portions a heating portion having at least one electrical resistance heating trace provided thereon and an anti-surge portion having at least one anti-surge baffle standing off therefrom, two functional portions of the plastic component being connected to one another movably relative to one another.

It is thereby possible to generate the planar plastic component in an extended position that is as easy as possible to handle, and to generate after manufacture thereof, by relative movement of the two functional portions, a shape that in principle is ready for operation of the combined heating and anti-surge apparatus manufactured from the preform. This does not have to mean that the shape of the preform thereby created by relative movement of the two functional portions is immediately operationally ready. It simply means that the shape thereby created does not need to be further modified for use in a reservoir tank, but instead is the final shape of the planar plastic component in the finished apparatus.

Thanks to the movable connection of two functional portions, the latter on the one hand can be connected to one another in captive fashion, and on the other hand can be brought in rapid and uncomplicated fashion into a shape for subsequent use of the apparatus constituted from the preform.

The heating portion and the anti-surge portion are recited above as functional portions. These are always present on the preform according to the present invention. The present description should not be misunderstood, however, to mean that the heating portion and the anti-surge portion must be the only functional portions of the preform. It is thus not to be excluded that the preform or the apparatus (heating and anti-surge apparatus) constituted therefrom may comprise a further functional portion that can be one of the two functional portions connected movably to one another.

In principle, the two functional portions can be connected to one another movably relative to one another in any manner. In order to ensure that the relatively movable connection connects the two functional portions to one another in captive fashion, provision is preferably made that the two functional portions are connected to one another pivotably relative to one another around a pivot axis.

By pivoting the two functional portions relative to one another a compact plastic component can be generated from an extended planar plastic component, and/or it is possible to constitute, from an extended planar plastic component, a less-extended, non-flat plastic component that permits the constitution of a shape that prevents surging of operating fluid, in a direction orthogonal to the pivot axis, in a tank comprising the apparatus. For example, the two planar functional portions, in particular in the form of a heating portion and anti-surge portion, can be set at an angle to one another in the manner of a pitched roof by pivoting around the pivot axis, so that the elevation constituted by the two functional portions represents a barrier for the operating fluid against a flow movement orthogonally to the pivot axis.

In principle, the preform or also the apparatus constituted therefrom can comprise more than two functional portions movable relative to one another, so that a more complex three-dimensional shape can be constituted from the functional portions. For example, several functional portions connected to one another movably relative to one another can each be connected to one another pivotably pairwise around a respective pivot axis, such that at least a plurality of the pivot axes, preferably all the pivot axes, proceed parallel to one another. The plastic component can thereby be brought into a corrugated shape that inhibits a movement of the operating fluid orthogonally to the pivot axes. The anti-surge baffles of the anti-surge portion can enclose an angle, preferably a right angle, with the at least one pivot axis, so that the anti-surge baffles inhibit a movement of the operating fluid parallel to the pivot axes. The apparatus constituted from the preform can thus counteract an undesired surging movement of the operating fluid in two mutually orthogonal directions in the tank carrying the apparatus.

In accordance with this advantageous refinement, the preform can comprise more than one heating portion and/or more than one anti-surge portion.

For maximally captive connection of the two functional portions to one another, according to an advantageous refinement of the present invention provision can be made that the two functional portions are movably connected to one another integrally. If the preform comprises more than two functional portions, preferably more than two functional portions are integrally connected to one another movably relative to one another. The integral connection of functional portions to one another furthermore allows the preform to be manufactured in a minimum number of process steps, preferably in a single process step.

The plastic component is preferably manufactured by injection molding, so that at least the plastic component can be generated in a single injection-molding step.

The electrical resistance heating trace is preferably manufactured before the plastic component is generated, for example using an etching technique known per se. The electrical resistance heating trace can then be laminated onto the plastic component, for example using a carrier film carrying the resistance heating trace. Polyolefin films, in particular polypropylene films, have proven successful as carrier films.

Alternatively, the electrical resistance heating trace can be overmolded with the plastic material of the subsequent plastic component. For this, the resistance heating trace can be placed, before manufacture of the plastic component by injection molding, into an injection-molding cavity of an injection-molding tool used to manufacture the plastic component. Placement of the resistance heating trace can in turn be simplified by previously applying the heating trace onto a carrier film.

The resistance heating trace on the preform, and consequently also on the apparatus constituted therefrom, is therefore preferably covered at least in portions, preferably entirely, by a film. The film is preferably transparent in order to facilitate monitoring that the heating trace is intact.

In order to furnish the advantageous pivot connection, according to a preferred embodiment of the present invention the two functional portions are connected to one another movably relative to one another by way of a hinge portion. An advantageous integral connection by way of a hinge portion can be achieved, for example, by embodying a film hinge between two functional portions. Very generally, the hinge portion can have a lesser component thickness compared with the functional portions connected by it.

Be it noted at this juncture that the adjective "planar" refers to a component whose thickness is small compared with its two principal dimension directions that are orthogonal to one another and respectively to the thickness dimension. Because the plastic component does not need to be a flat plastic component, the thickness dimension can have different orientations in a stationary Cartesian coordinate system at different points on the plastic component. For example, the dimensions of the plastic component in its respective principal dimension directions can be greater than the thickness dimension by a factor of 40, preferably at least by a factor of 100. Although the thickness dimension is preferably constant, it can also exhibit different values locally over the extent of the plastic component, the at least one hinge portion preferably having a lesser thickness than the functional portions connected by it. The functional portions themselves are preferably rigid, i.e. not intended to deform.

In order to ensure that two functional portions connected movably relative to one another not only can be brought into a desired predetermined relative position but also can be held permanently therein, provision can be made that the two functional portions comprise immobilization means that are embodied to immobilize the two functional portions in a predetermined relative position relative to one another. The predetermined relative position is preferably a predetermined operationally ready position, i.e. a position that requires no modification, or modification only to a negligible extent, prior to initial operation of the heating and anti-surge apparatus, constituted from the preform, in an automotive reservoir tank.

Adhesive immobilization means, for example adhesives, can be utilized as immobilization means. Adhesives can lose their adhesive effect, however, as a result of aging, in particular under the additional influence of temperature fluctuations. An operating fluid received in the automotive reservoir tank carrying the combined heating and anti-surge apparatus can furthermore produce undesired degradation of an adhesive. The immobilization means are therefore preferably embodied as physical, in particular positively engaging, immobilization means. In accordance with a preferred refinement of the present invention, the immobilization means therefore comprise on one of the functional portions an immobilization configuration that, in the predetermined relative position, passes through and/or engages behind a counterpart immobilization configuration on the respective other functional portion.

For example, the immobilization configuration and counterpart immobilization configuration can constitute a snap-lock system, in particular an overridable snap-lock system. But because utilization in a motor vehicle is also subject to impact loads, the establishment of a nondetachable connection made up of the immobilization configuration and counterpart immobilization configuration is preferred. "Nondetachable" here means "not detachable without destroying the structure."

A nondetachable connection of this kind can be established, for example, if the immobilization configuration comprises a rivet blank that, in the predetermined relative position, passes through a passthrough opening that constitutes the counterpart immobilization configuration and passes through the respective other functional portion in the latter's thickness direction. The rivet blank is preferably embodied integrally with the plastic material of the associated functional portion, i.e. as a plastic rivet blank that stands off protrudingly from the functional portion on one side. When the rivet blank passes through the passthrough opening in the respective other functional portion and the two functional portions have been brought into their final relative position relative to one another, the free end of the rivet blank can be deformed by means of a riveting tool, under the influence of heat, to yield a rivet head that permanently holds the functional portion comprising the passthrough opening between the rivet head and the functional portion comprising the original rivet blank. The rivet head is completely embodied on the operationally ready heating and anti-surge apparatus.

As has already been indicated above, one of the two functional portions can be the heating portion and the respective other functional portion can be the anti-surge portion.

The above description of the heating portion and of the anti-surge portion is not intended in principle to mean that the heating portion is only a heating portion but not also an anti-surge portion, and vice versa. Preferably, however, the heating portion is devoid of anti-surge baffles. Alternatively or additionally, provision can be made that the anti-surge portion is devoid of electrical resistance heating traces. If only one functional portion is devoid of the function of the respective other functional portion, preferably the heating portion is devoid of anti-surge baffles. At least one electrical resistance heating trace can, however, certainly be provided on the anti-surge portion.

Alternatively or additionally, one of the two functional portions can be the heating portion, and the respective other functional portion can be a contact portion that comprises a connector configuration for connection to a current source and is embodied to pass current from the connector configuration through to the at least one electrical resistance heating trace. In this case the heating portion can be embodied captively with a contact portion, and the contact portion can be brought, relative to the heating portion, into a location and orientation that are particularly advantageous for the respective use case. It is thereby possible to constitute, from a single preform, a combined heating and anti-surge apparatus that is arrangeable in connection-ready fashion in different tank shells depending on the selected deformation of the heating portion and contact portion.

The plastic component can be constituted by more than one plastic component so that different functional components can be equipped as advantageously as possible for their respective function as intended. For example, the heating portion can be constituted from solid plastic for maximum conduction of heat proceeding from the resistance heating trace. The plastic can be filled for that purpose with particles and/or fibers made of a material having a higher specific thermal conductivity than the plastic matrix.

The anti-surge baffles can be constituted from foamed plastic in order to furnish them with high ductility so that the baffles do not break if there is ice in the tank.

The present invention further relates to a combined heating and anti-surge apparatus for automotive operating fluid tanks, in particular for automotive reservoir tanks for aqueous urea solution, which is manufactured from a preform as described above and advantageously refined.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein.

DESCRIPTION OF PREFERRED EMBODIMENTS

Figure 1:
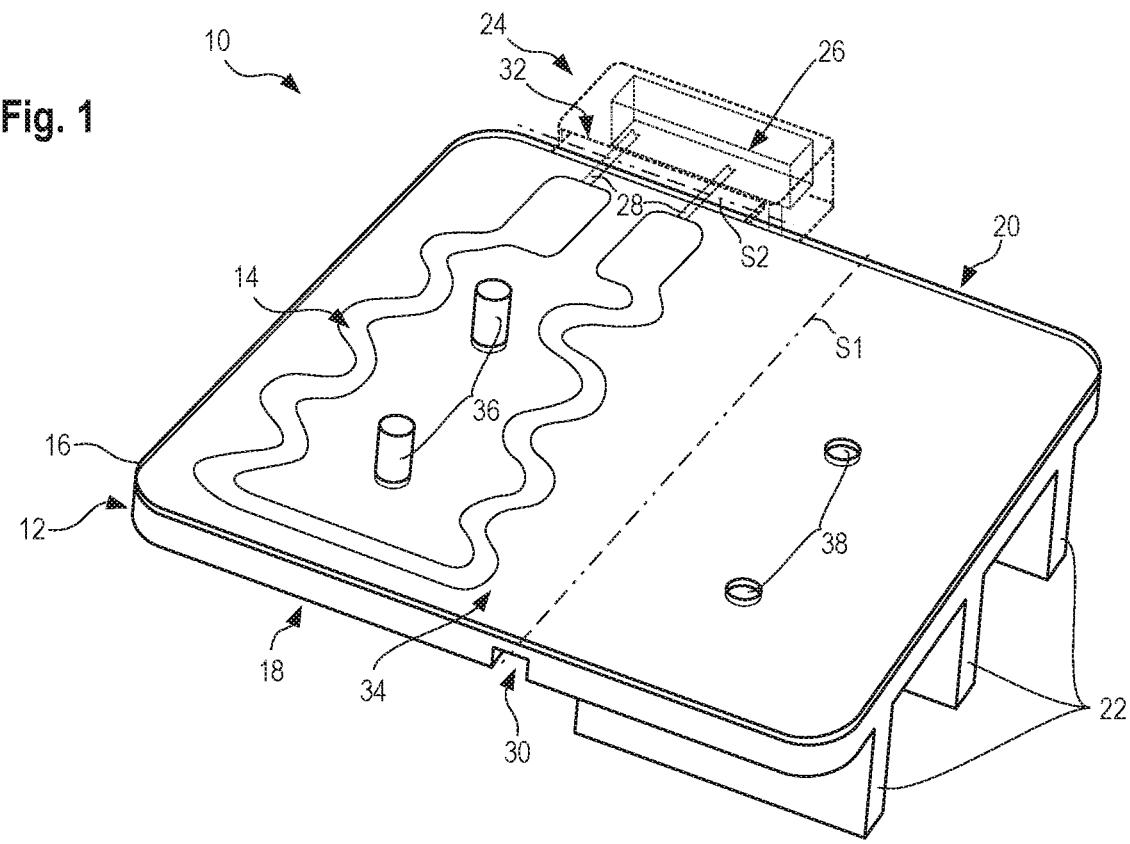
FIG. 1 is a schematic perspective view of an embodiment according to the present invention of a preform for constituting a combined heating and anti-surge apparatus.

Referring now to the drawing wherein the showings are for the purpose of illustrating preferred and alternative embodiments of the invention only and not for the purpose of limiting the same, FIG. 1 shows an embodiment according to the present invention of a preform for manufacturing a combined heating and anti-surge apparatus that is designated in general as 10. Preform 10 encompasses a plastic component 12 that advantageously is manufactured in one piece using the injection-molding process. It is therefore preferably devoid of joins. It further encompasses an electrical resistance heating trace 14 that either is laminated by means of a carrier film 16 onto plastic component 12 or has been overmolded by the plastic material of plastic component 12 during injection-molding manufacture thereof.

Plastic component 12 in FIG. 1 has, by way of example, three functional portions: a heating portion 18 in which electrical resistance heating trace 14 is arranged; an anti-surge portion 20 on which a plurality of anti-surge baffles 22 are embodied; and a contact portion that comprises a connector configuration (not depicted in further detail) for contact to a current source (likewise not depicted) so that resistance heating trace 14 can be supplied as intended with electrical energy. Contact portion 24 is depicted in FIG. 1 merely for the sake of completeness, and there only with dashed lines. Contact portion 24 comprises a receiving space 26, indicated in FIG. 1, into which a current source-side counterpart connector configuration is introducible for contacting the connector configuration, and is preferably latchable thereto. Busbars 28 (also indicated merely with dashed lines) connect resistance heating trace 14 to the connector configuration of contact portion 24.

Heating portion 18 and anti-surge portion 20 are connected to one another, pivotably relative to one another as intended around a first pivot axis S1, with interposition of a first hinge portion 30. First hinge portion 30 is less thick than heating portion 18 and anti-surge portion 20.

Heating portion 18 and contact portion 24 are also connected to one another, pivotably relative to one another as intended around a second pivot axis S2, by way of a second hinge portion 32 in the form of a film hinge.

Figure 2:
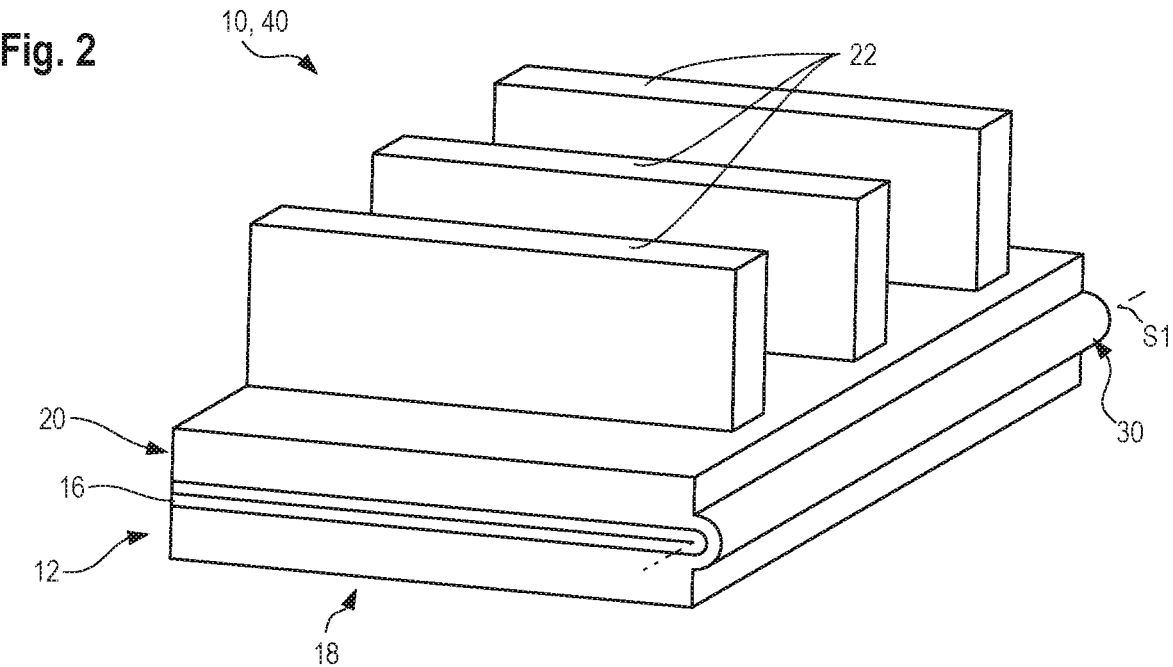
FIG. 2 is a schematic perspective view of an embodiment according to the present invention of a combined heating and anti-surge apparatus that is constituted from the combined heating and anti-surge preform of FIG. 1.

Plastic component 12 furthermore comprises immobilization means 34 so that heating portion 18 and anti-surge portion 20 can be immobilized in a predetermined relative position. In the exemplifying embodiment depicted, immobilization means 34 encompass, by way of example, rivet blanks 36 that project on one side from heating portion 18 and, in the completed combined heating and anti-surge apparatus 40 as shown in FIG. 2, penetrate through passthrough openings 38 in anti-surge portion 20. Carrier film 16 can be recessed in the region of passthrough openings 38, or can be penetrated or punched out by rivet blanks 36 constituting a punching tool.

Baffles 22 can be manufactured from the same material component as the remainder of plastic component 12. Alternatively, in order to furnish greater robustness, they can be constituted from a foamed plastic component. Plastic component 12 can therefore be manufactured using a two- or multi-component injection molding process.

FIG. 2 shows combined heating and anti-surge apparatus 40 manufactured from preform 10.

Heating portion 18 and anti-surge portion 20 have been folded or pivoted 180° toward one another around first pivot axis S1. Those parts of carrier film 16 which are associated with the respective individual functional portions 18 and 20 of preform 10 and of plastic component 12 abut with zero clearance against one another. Heat transfer from heating trace 14 through plastic component 12 therefore does not require a convective transfer section that, as a rule, has greater transmission resistance compared with thermal conduction. Heat can instead be conveyed conductively through the individual functional portions or component portions of plastic component 12 and of carrier film 16.

Contact portion 24 (no longer depicted in FIGS. 2 to 4) can also be pivoted around second pivot axis S2 relative to heating portion 18. Contact portion 24 of the completed heating and anti-surge apparatus 40 can thereby be introduced into a recess, prepared for contact portion 24, in a tank shell of the tank that receives apparatus 40. The prepared recess can be arranged at different points, and in different orientations, in different tanks. Thanks to the movable arrangement of contact portion 24 relative to the other functional portions 18 and 20, it is possible to manufacture from a single preform 10 a combined heating and anti-surge apparatus 40 that can be arranged, with no design modification, in different tanks for different vehicles.

Figure 3:
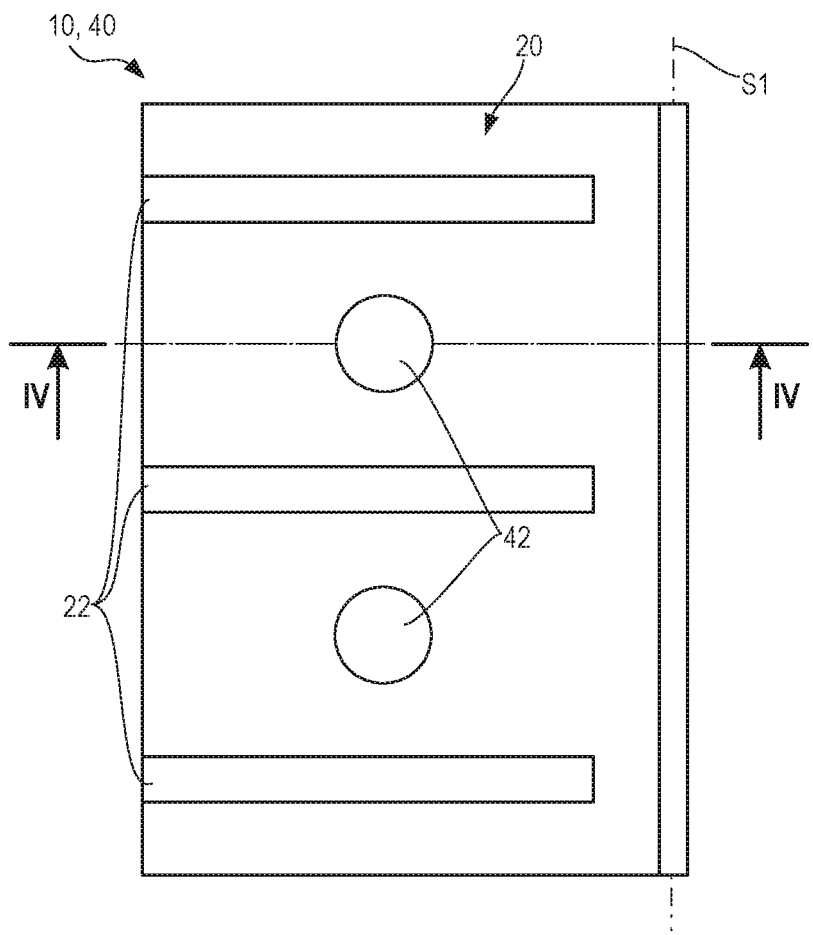
FIG. 3 is a schematic plan view of the combined heating and anti-surge apparatus of FIG. 2.

FIG. 3 is a depiction from above (plan view) of apparatus 40 manufactured from preform 10. Apparent therein are rivet heads 42 that, after functional portions 18 and 20 were pivoted toward one another and after passthrough openings 38 were, as a result, penetrated by rivet blanks 36, were deformed by means of a corresponding rivet tool at the longitudinal end of rivet blank 36 located remotely from heating portion 18, so that rivet heads 42 hold anti-surge portion 20 between themselves and heating portion 18. The diameter of rivet heads 42 is therefore greater than the diameter of the associated passthrough openings 38.

Figure 4:
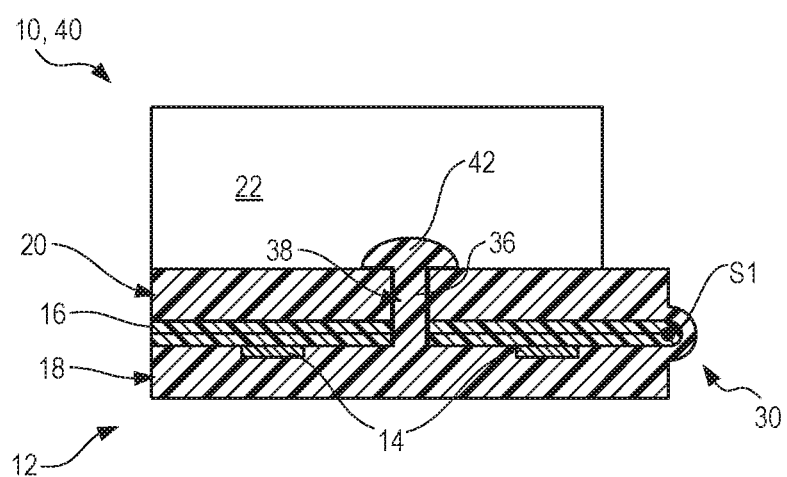
FIG. 4 is a schematic section view through the combined heating and anti-surge apparatus of FIGS. 2 and 3, along section plane IV-IV of FIG. 3.

FIG. 4 is a cross-sectional view along section plane IV-IV of FIG. 3, orthogonal to the drawing plane of FIG. 3. It is apparent therein as well that once the relative position of heating portion 18 and anti-surge portion 20 has been reached, it can be retained as a result of the formation of rivet heads 42.

As FIG. 4 shows, heating trace 14 (whose dimensions are exaggerated as shown in FIG. 4), is countersunk into the plastic of heating portion 18. These countersunk areas occur when heating trace 14, with its carrier film 16, is placed into an injection-molding cavity of an injection-molding tool for the manufacture of plastic component 12, and then overmolded with plastic material of plastic component 12.

In the alternative case of laminating carrier film 16, having heating trace 14, onto plastic component 12, heating trace 14 would be elevated above the surface of plastic component 12 on which it lies.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A combined heating and anti-surge preform that is embodied for manufacture of a combined heating and anti-surge apparatus for automotive operating fluid tanks, comprising a planar plastic component having at least one electrical resistance heating trace provided thereon and having at least one anti-surge baffle embodied integrally with the planar plastic component and standing off therefrom,
wherein the planar plastic component comprises two functional portions including a heating portion having the at least one electrical resistance heating trace provided thereon and an anti-surge portion having the at least one anti-surge baffle standing off therefrom, the two functional portions of the planar plastic component being connected to one another movably relative to one another.

2. The combined heating and anti-surge preform according to claim 1, wherein the two functional portions are connected to one another pivotably relative to one another around a pivot axis.

3. The combined heating and anti-surge preform according to claim 1, wherein the two functional portions are movably connected to one another integrally.

4. The combined heating and anti-surge preform according to claim 2, wherein the two functional portions are connected to one another by way of a hinge portion.

5. The combined heating and anti-surge preform according to claim 4, wherein the hinge portion includes a film hinge.

6. The combined heating and anti-surge preform according to claim 1, wherein the two functional portions include an immobilization arrangement, the immobilization arrangement being configured to immobilize the two functional portions relative to one another.

7. The combined heating and anti-surge preform according to claim 6, wherein the immobilization arrangement is configured to immobilize the two functional portions relative to one another in a predetermined relative position.

8. The combined heating and anti-surge preform according to claim 7, wherein the predetermined relative position is a predetermined operationally ready position.

9. The combined heating and anti-surge preform according to claim 7, wherein the immobilization arrangement comprises on one of the two functional portions an immobilization configuration that, in the predetermined relative position, passes through and/or engages behind a counterpart immobilization configuration on the respective other of the two functional portions.

10. The combined heating and anti-surge preform according to claim 9, wherein the immobilization configuration comprises a rivet blank that, in the predetermined relative position, passes through a passthrough opening that constitutes the counterpart immobilization configuration of the respective other of the two functional portions and the rivet blank passes through the respective other of the two functional portions in a thickness direction of the respective other of the two functional portions.

11. The combined heating and anti-surge preform according to claim 1, wherein one of the two functional portions is the heating portion; and a respective other functional portion is the anti-surge portion.

12. The combined heating and anti-surge preform according to claim 1, wherein at least one of the heating portion is devoid of anti-surge baffles and the anti-surge portion is devoid of electrical resistance heating traces.

13. The combined heating and anti-surge preform according to claim 1, further including a contact portion that comprises a connector configuration for connection to a current source and is embodied to pass current from the connector configuration through to the at least one electrical resistance heating trace.

14. The combined heating and anti-surge preform according to claim 6, further including a contact portion that comprises a connector configuration for connection to a current source and is embodied to pass current from the connector configuration through to the at least one electrical resistance heating trace.

15. A combined heating and anti-surge apparatus for automotive operating fluid tanks, in particular for automotive reservoir tanks for aqueous urea solution, manufactured from a preform according to claim 1.

* * * * *